United States Patent [19]

Lloyd

[11] Patent Number: 5,255,794

[45] Date of Patent: Oct. 26, 1993

[54] FUEL FILTER

[75] Inventor: Roger C. Lloyd, Suffolk, England

[73] Assignee: Lucas industries public limited company, West Midlands, England

[21] Appl. No.: 949,431

[22] Filed: Sep. 22, 1992

[30] Foreign Application Priority Data

Oct. 1, 1991 [GB] United Kingdom ............... 9120863

[51] Int. Cl.$^5$ ............................................. B01D 29/44
[52] U.S. Cl. .................................. 210/232; 210/446; 210/451; 210/488
[58] Field of Search ............... 210/446, 451, 488, 455, 210/477, 232, 435; 138/40, 42; 403/298, 354; 411/177, 179, 180, 182

[56] References Cited

U.S. PATENT DOCUMENTS 1,025,759  5/1912  Cluskey .............................. 403/298
3,498,353  3/1970  Barry .................................. 411/180

FOREIGN PATENT DOCUMENTS 481517  6/1953  Italy ...................................... 210/451

Primary Examiner—Matthew O. Savage
Attorney, Agent, or Firm—Trexler, Bushnell, Giangiorgi & Blackstone, Ltd.

[57] ABSTRACT

An edge type filter for liquids comprises an elongated member which has spaced cylindrical portions which are a close fit within a bore in a filter body. The part of the member intermediate the cylindrical portions the member is of square section to define with the wall of the bore, controlled clearances which provide the filtering action. Grooves place alternate ones of the flow channels defined between the wall of the bore and the sides of the part with either the inlet or the outlet. The member is retained in the bore by providing on the cylindrical portion adjacent the inlet, a projecting edge which is defined at the junction of a radial end surface of the cylindrical portion and a side surface which inclines inwardly towards the surface of the cylindrical portion. At the outlet end the member is located against the end of the bore.

4 Claims, 1 Drawing Sheet

FUEL FILTER

This invention relates to a so-called edge filter for liquids and of the kind comprising an elongated member which is housed within a cylindrical bore in a filter body, the opposite ends of the bore forming the inlet and outlet of the filter, the member defining axially spaced cylindrical portions which are a close fit in the bore, the member intermediate said cylindrical portions defining a controlled clearance with the wall of the bore and at least a pair of flats formed lengthwise on the member, the first flat extending to adjacent one of said cylindrical portions and the second flat extending to adjacent the other of said cylindrical portions, the opposite ends of said flats communicating with the inlet and outlet of the filter respectively, the arrangement being such that contaminant in the liquid and which is larger than the controlled clearance, will be retained in the flat which is directly connected to the inlet of the filter.

Such filters are commonly employed to filter the fuel which is supplied to fuel injection nozzles which supply fuel to internal combustion engines particularly compression ignition engines. In such cases the body of the filter can form part of the body of the injection nozzle however, the filter can be a separate item located in the pipeline connecting the inlet of the nozzle with the outlet of a fuel injection pump.

It is known to retain the member within the bore by means of an interference fit between the one of said cylindrical portions which is adjacent the inlet, and the wall of the bore Alternatively, a part of said one portion may be knurled or splined so that as the member is inserted into the bore the knurling or the splines bite into the material forming the filter body.

The pressure at which fuel is supplied to fuel injections nozzles particularly those for supplying fuel to compression ignition engines, has steadily increased over the past years in order to enhance the performance of the engine particularly in terms of the reduction of exhaust emissions and the improvement in the fuel economy. Moreover, the sizes of the outlet orifices of the nozzle have been reduced so that the task performed by the edge filter has become even more vital. When fuel is being supplied to the nozzle the pressure drop which occurs tends to force the member towards the outlet end of the bore however, when the valve member of the fuel injection nozzle closes pressure pulses can occur in the reverse direction and which therefore tend to urge the member towards the end of the bore forming the inlet. If the member is not firmly anchored in the bore axial movement of the member can occur and the rubbing action can cause burrs which may become detached and which may then be forced into the fuel injection nozzle causing malfunction of the nozzle.

The object of the invention is to provide an edge filter of the aforesaid kind in an improved form.

According to the invention in an edge filter of the kind specified the end of the elongated member adjacent the outlet of the filter is shaped to engage with the adjacent end of the bore and the opposite end of the member is shaped to define a projecting edge which is so disposed that it is displaced as the member is forced into the bore but engages and digs into the wall of the bore to resist displacement of the member away from the end of the bore connected to the outlet.

Figure 1:
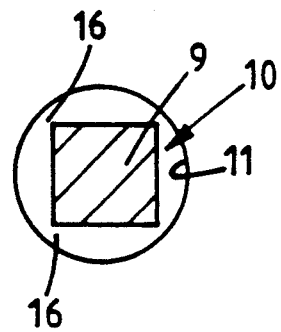
FIG. 1 is a section through the edge filter intermediate its ends.

Referring to drawings the filter comprises an elongated member 10 which is located within a cylindrical bore 11. The inlet end of the bore is indicated at 12 and the outlet end of the bore at 13.

The member 10 is formed with two cylindrical portions 14, 15 which are a close fit within the bore and intermediate the portions 14 and 15 the member is of square section with the distance across the corners being less than the diameter of the bore 11 to provide controlled clearances 16. The sides of the part 9 of the member lying between the cylindrical portions 14, 15 constitute flats and define with the wall of the bore, elongated flow channels one opposite pair of which are connected to the inlet and the other opposite pair to the outlet.

Figure 3:
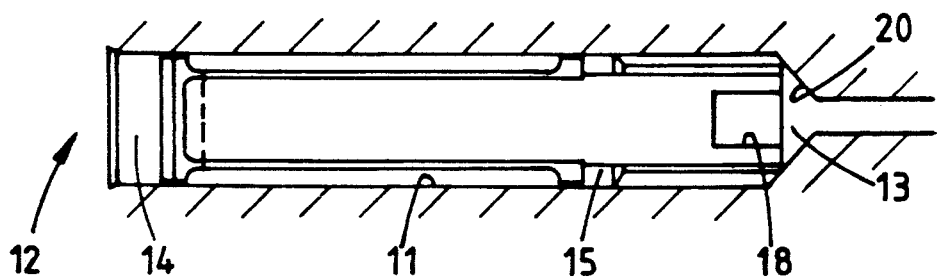
FIG. 3 is a view similar to FIG. 2 taken at right angles but showing the member in a bore.

The connection of the one pair of flow channels to the inlet 12 is achieved in the arrangement shown by machining a transverse slot 17 in the cylindrical portion 14 of the member. The slot 17 has another purpose which will be described. The connection of the other pair of flow channels to the outlet 13 is achieved by extending the respective sides or flats of the part 9 of the member across the cylindrical portion 15 as seen in FIG. 3. Moreover, a further transverse slot 18 is formed at the outlet end of the body and this serves to place the channels formed by the extended portions of the aforesaid sides in communication with each other and with an outlet which opens into the bore.

In use, fuel which is delivered to the inlet 12 flows into the one pair of channels and then laterally in both directions, through the controlled clearances 16, to the other pair of channels and to the outlet 13. The controlled clearances 16 serve to retain contaminant which is larger than the clearances.

Figure 4:
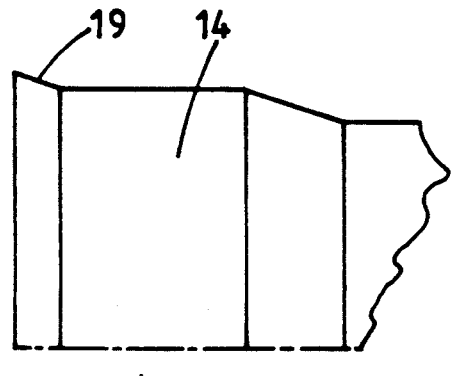
FIG. 4 is a side view to an enlarged scale of part of the member seen in FIGS. 2 and 3.

Turning now to FIG. 4, the peripheral surface of the cylindrical portion 14 is machined to define projecting edges 19 which have a diameter slightly larger than that of the cylindrical portion 14. The edges are defined at the junction of the radial end face of the member and side surfaces which incline inwardly towards the surface of the cylindrical portion 14.

During assembly the member 10 is pressed firmly into the bore 11 so that the end adjacent the cylindrical portion 15 engages with the end surface 20 of the bore and during this movement the projecting edges 19 are displaced inwardly, this movement being facilitated by the provision of the slot 17. However if any attempt is made to move the member in the opposite direction, the projecting edges 19 tend to dig into the material forming the wall of the bore so as to resist displacement of the member. The member is therefore securely anchored against movement in either direction with the result that the burrs as described in relation to the prior art, are not formed.

Figure 2:
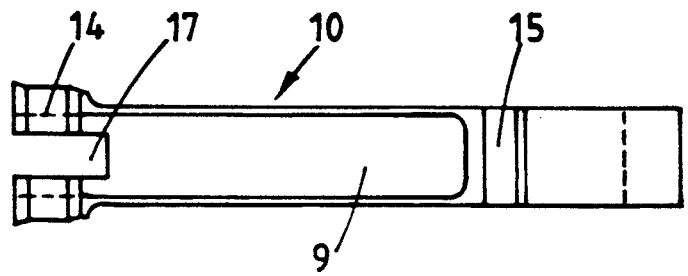
FIG. 2 is a side view of an elongated member forming part of the filter.

In a modification which is shown in dotted outline in FIG. 2, the flats which communicate with the inlet 12 extend across the cylindrical portion 14. With this modification the slot 17, since it no longer conveys fuel, can be narrower and less deep.

I claim:

1. An edge filter for liquids comprising an axially elongated member housed within a cylindrical bore in a filter body, said member having a longitudinal axis, the ends of the bore forming an inlet and outlet of the filter, the end of the bore adjacent the outlet having a shoulder, the member including a pair of cylindrical portions, said cylindrical portions of the member being spaced apart along the longitudinal axis of the member, a non-cylindrical portion positioned between the cylindrical portions, the outside surfaces of the cylindrical portions having a dimension which is substantially equal to an inside dimension of the bore, the non-cylindrical portion of the member lying intermediate of said cylindrical portions defining controlled clearance spaces between the wall of the bore, at least a pair of flats formed lengthwise on the member, a first flat extending to adjacent one of the cylindrical portions, and a second flat extending to adjacent the other of said cylindrical portions, the opposite ends of the flats communicating with the inlet and outlet of the filter respectively, so that contaminants in the liquid of which are larger than a said controlled clearance space will be retained in the flat which is connected directly to the inlet of the filter, a first end of the elongated member adjacent the outlet of the filter being shaped to engage said shoulder of the bore and a second end of the member disposed opposite the first end having displaceable portions formed thereon, said second end including slot means extending along said longitudinal axis for permitting said displacement in a direction perpendicular of said axis, a projecting edge being formed on said displaceable portions, wherein each said projecting edge is formed by a first surface adjacent said second end which extends substantially perpendicularly of said longitudinal axis and a second surface which tapers radially inwardly towards said longitudinal axis in a direction toward said second end, whereby said edges are displaced inwardly towards said axis as the member is forced into the bore toward said shoulder but which engage and dig into a wall of the bore to resist displacement of the member in a direction away from said shoulder.

2. An edge filter according to claim 1, in which said displaceable portions and said projecting edge are defined about the cylindrical portion which is located at the inlet end of the bore.

3. An edge filter according to claim 1, wherein said slot means comprises a slot formed through the first end of the member transverse to said longitudinal axis of the member so that a pair of projecting edges formed, the pair of projecting edges being spaced apart on either side of the slot.

4. An edge filter for liquids comprising:
an elongated member housed within a cylindrical bore in a filter body, said member having a longitudinal axis, said bore having ends forming an inlet and an outlet of the filter body, the end of the bore adjacent said outlet having a shoulder;
an outside surface of said member having cylindrical positions, an outside dimension of said cylindrical portions being substantially equal to an inside dimension of said cylindrical bore;
at least a pair of flat surfaces formed on the outside surface of said elongated member, said flats being positioned intermediate said cylindrical portions generally spacing said cylindrical portions apart from one another, an inlet end of said flat surfaces communicating with said inlet and an outlet end of said flat surfaces communicating with said outlet of the filter body;
a controlled clearance area being defined between said flat surfaces and the corresponding inside surface of said cylindrical bore, said controlled clearance area retaining contaminants in the liquid which passes therethrough which the larger than said controlled clearance area;
a first end of said elongated member adjacent said outlet of said filter body being shaped for engaging said shoulder of said cylindrical bore and a second end of said elongated member disposed opposite said first end, a slot being formed through said second end of the elongated member transverse to the longitudinal axis of said elongated member and communicating with at least one of said flat surfaces;
a first portion and a second portion of said elongated member being defined on each side of said slot, a projecting edge extending for an outside surface of each of said first and second portions, wherein each said displacement edge is formed by a first surface adjacent said second end which extends substantially perpendicularly of said longitudinal axis and a second surface which tapers radially inwardly towards said longitudinal axis in a direction toward said second end, wherein said first and second portions are displaceable inwardly relative to said slot when said elongated member is forced into said cylindrical bore and displaceable outwardly relative to said slot such that said projecting edges engage and dig into said inside surface of said bore to resist displacement of said member in a direction away from said shoulder.

* * * * *